Aug. 18, 1936.  S. QUISLING  2,051,574
SLIDING FASTENER
Filed April 16, 1934
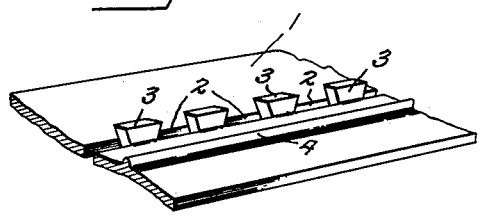
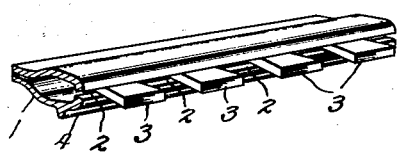
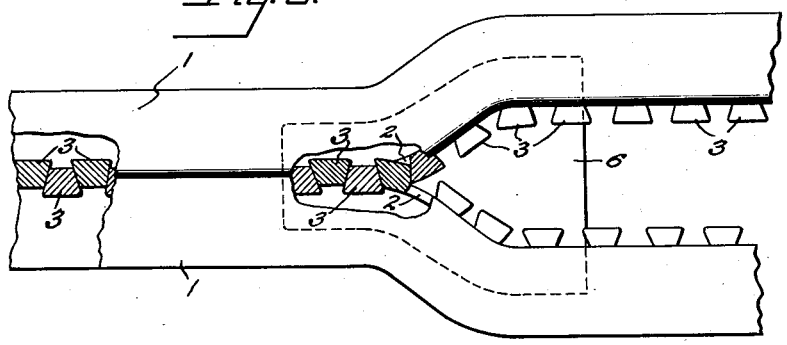
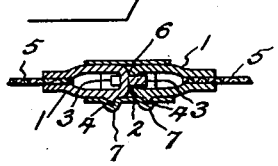
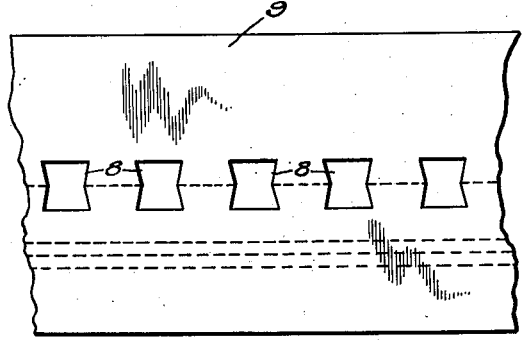
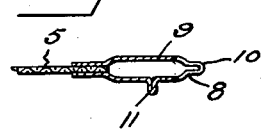
Inventor
Sverre Quisling Patented Aug. 18, 1936

2,051,574

UNITED STATES PATENT OFFICE 2,051,574

SLIDING FASTENER

Sverre Quisling, Madison, Wis., assignor to Hookless Fastener Company, Meadville, Pa., a corporation of Pennsylvania Application April 16, 1934, Serial No. 720,692

2 Claims. (Cl. 24—205)

This invention relates to an improved flexible slide fastener and has for its object the provision of a fastener which may be made of one continuous strip of yieldable material such as rubber or the like.

Another object of the invention is to provide a slide fastener in which all of the elements are invisible when opposite sides of the fastener are brought together.

A further object is the provision of a fastener whose opposite sides are flush when together, thereby providing a practically air and water tight fastener.

A still further object is to provide a fastener which is soft and flexible so that it may be used on clothing to be worn next to the body without causing the slightest irritation.

The invention also contemplates a fastener which employs opposite sides of like design thereby permitting standardized manufacture and subsequently reducing the cost of production.

With these and other objects in view, the invention resides in the arrangement of parts herein shown and described, and it is of course understood that changes may be made from the precise construction shown and material described without departing from the scope of what is claimed.

In the drawing:—

Fig. 1 is a perspective view of a strip, from which one side of the fastener is to be formed, as it appears after being formed in the die;

Fig. 2 is a perspective view of the same strip after being bent into shape;

Fig. 3 is an elevational view, having parts broken away, of a complete slide fastener;

Fig. 4 is a transverse section through a complete fastener showing a portion of the slide used in joining and separating;

Fig. 5 is an elevational view of a blank for forming a modified form of fastener; and Fig. 6 is a transverse section through a complete fastener of the modified construction.

In Fig. 1, is shown a strip of some soft yieldable material such as rubber or the like which has been formed in any suitable manner with spaced openings 2 and interspaced integral projections 3. The strip may be formed, for example, by molding a strip of rubber to include the flat portion 1 and a projecting rib which includes the projecting portions 3. After forming, the rib and flat part may be cut away at regular intervals to provide the openings 2 and regularly spaced projections 3. At one side of the projections and extending longitudinally along one side of the strip is a rib 4 designed to provide guide means for the strip when the fastener is being opened or closed. After the strip has been so formed, it is turned back on either side of the line of the projections 3, the free edges of the strip being secured in any appropriate manner to a tape or clothing material 5. This forms one complete side of the fastener and consists of top and bottom walls spaced apart and presenting upon its outer face a series of spaced projections and a series of spaced openings between the projections. The opposite sides of the fastener are exact duplicates, but staggered in relation to one another, the projections 3 of one side being opposite, and adapted to engage in, the openings 2 of the other side.

A slide 6 is provided to bring the free edges of the fastener into engagement with one another, the slide being provided with channels 7 adapted to receive the ribs 4 depending from the lower walls of the opposing fastener elements. The slide will bring the projection 3 upon one side of the fastener into registration with the openings 2 in the opposite side at an angle. Thus one corner of the projection will first enter the opening and then be turned. Due to the flexible qualities of the material used the projections may be more or less squeezed into the openings and therefore when the two sides of the fastener are in engagement an unusually tight joint is formed which will become tighter when any force is applied to pull them apart. It will be seen in Fig. 3 of the drawing that when the fastener is closed, all parts are completely hidden from view leaving only two smooth abutting surfaces. Reverse movement of the slide allows the projections to be removed from the openings and separates the free edges of the fastener.

In Figs. 5 and 6 is shown a modified form of the invention. In this form openings 8, of substantially hour-glass shape are cut in a strip of soft material 9. The strip 9 is folded upon itself longitudinally along a line passing thru the center of the openings 8, the material between the openings forming projections 10 corresponding to the projections 3 of the preferred form, and the openings 8 occupying a like position and corresponding to the openings 2. A portion of the lower wall is bent downwardly to form a rib 11 similar to rib 4. As the action of the type fastener is identical to that of the preferred form, no explanation of its operation is deemed necessary.

Another method of making the invention would include projection members such as 3 in Fig. 1 to be made of more rigid material fastened between two flexible strips such as 1 to be so spaced that there would be openings as at 2. If said projecting members were of rigid material of course, the spaces 2 would have to be relatively longer to permit of ease of engagement.

Having thus described my invention what I claim is:

1. A slide fastener comprising oppositely disposed elements, each element formed of a single strip of a yieldable material folded upon itself, having a series of spaced openings formed in the folded edge thereof, a series of spaced projections integral with the strip and located between the openings, said projections being adapted to enter into the openings of the opposite element and engage the walls thereof when the projections and openings are brought together at the proper angle, and a slide for bringing the elements into or out of an engagement with one another.

2. A slide fastener comprising oppositely disposed elements formed from a single strip of a yieldable material folded upon itself down its length to provide walls, the strip having a series of spaced openings formed in the folded edge thereof, a series of spaced projections integral with the strip and located between the openings, said projections being adapted to enter into the openings in the opposite element and engage the walls thereof when the projections and openings are brought together at the proper angle, a rib extending from one wall of each element, and a slide having channels therein to receive said ribs and guide the elements into and out of engagement with one another.

SVERRE QUISLING.